US 6,558,076 B2

(12) United States Patent
Liaw

(10) Patent No.: US 6,558,076 B2
(45) Date of Patent: May 6, 2003

(54) FLOW PERMEABLE PORT EMBANKMENT

(76) Inventor: Chung-Yi Liaw, No. 8-2, Alley 4, Lane 18, Nanking W. Rd., Taipei (TW)

( * ) Notice: Subject to any disclaimer, the term of this patent is extended or adjusted under 35 U.S.C. 154(b) by 80 days.

(21) Appl. No.: 09/846,532

(22) Filed: Apr. 30, 2001

(65) Prior Publication Data

US 2002/0159842 A1 Oct. 31, 2002

(51) Int. Cl.$^7$ ................................................ E02B 3/06
(52) U.S. Cl. ........................................... 405/35; 405/30
(58) Field of Search ................................ 405/15–35, 284, 405/302.4, 302.6, 211, 212, 215; 114/219

(56) References Cited

U.S. PATENT DOCUMENTS

| | | | | | |
|---|---|---|---|---|---|
| 3,353,361 A | * | 11/1967 | Lloyd | ............................ | 405/28 |
| 3,842,606 A | * | 10/1974 | Stiles et al. | .................... | 405/19 |
| 3,884,042 A | * | 5/1975 | Anderson et al. | ............. | 405/27 |
| 4,139,319 A | * | 2/1979 | Anderson | ..................... | 405/15 |
| 4,150,909 A | * | 4/1979 | Hibarger et al. | .............. | 405/27 |
| 4,188,153 A | * | 2/1980 | Taylor | ........................ | 405/30 |
| 4,997,309 A | * | 3/1991 | Kiselewski | .................. | 405/16 |
| 5,011,327 A | * | 4/1991 | Thiac | ........................... | 405/28 |
| 5,178,489 A | * | 1/1993 | Suhayda | ...................... | 405/16 |
| 5,370,475 A | * | 12/1994 | LeBlanc | ...................... | 405/16 |
| 5,370,476 A | * | 12/1994 | Streichenberger | ............ | 405/15 |
| 5,645,371 A | * | 7/1997 | Marzullo | ..................... | 405/15 |
| 5,762,448 A | * | 6/1998 | Bilanin | ........................ | 405/211 |
| 5,833,387 A | * | 11/1998 | Tackney | ...................... | 405/21 |

* cited by examiner

Primary Examiner—Heather Shackelford
Assistant Examiner—Frederick L. Lagman
(74) Attorney, Agent, or Firm—Pro-Techtor International Services

(57) ABSTRACT

The present invention relates to a flow permeable port embankment, mainly constructed by multiple waste tires which are arranged in a longitudinal direction and a transverse direction. The port embankment includes multiple vertically arranged tires and multiple horizontally arranged tires that are combined with each other by fastening of cables. The horizontally arranged tires are poured with concrete. The port embankment can use a wave energy reduction device of central holes of the multiple vertically arranged tires, so that when a big wave or surge rushes into the port embankment through the central holes of the vertically arranged tires, the energy thereof is counteracted naturally and completely, so that the region in the port embankment is calm, thereby preventing ships in the port embankment from hitting each other.

1 Claim, 5 Drawing Sheets

FLOW PERMEABLE PORT EMBANKMENT

BACKGROUND OF THE INVENTION

1. Field of the Invention

The present invention relates to a flow permeable port embankment, and more particularly to a flow permeable port embankment constructed by waste tires that are arranged longitudinally and transversely, thereby providing a wave reduction effect by the central holes of the vertically arranged tires.

2. Description of the Related Art

A conventional port embankment in accordance with the prior art comprises multiple sunk tanks that are formed by pouring concrete into the sunk tanks, so as to form a concrete wall. However, by the concrete wall of the port embankment, the wave or surge outside the port embankment cannot be counteracted by the wave inside the port embankment. Thus, when the surge rushes into the port embankment, it will produce a huge wave, so that the ships in the port embankment will hit with each other, thereby wearing or breaking the ships. In addition, in the port embankment formed by concrete, the sea sand easily accumulates or deposits in the inlet of the port embankment, thereby causing danger to the ships entering the port embankment.

SUMMARY OF THE INVENTION

The present invention has arisen to mitigate and/or obviate the disadvantage of the conventional port embankment constructed by concrete.

The primary objective of the present invention is to provide a flow permeable port embankment that is mainly constructed by multiple waste tires which are arranged in a longitudinal direction and a transverse direction. The port embankment includes multiple vertically arranged tires and multiple horizontally arranged tires that are combined with each other by fastening of cables. The horizontally arranged tires are poured with concrete. The port embankment can use a wave energy reduction device of central holes of the multiple vertically arranged tires, so that when a big wave or surge rushes into the port embankment through the central holes of the vertically arranged tires, the energy thereof is counteracted naturally and completely, so that the region enclosed in the port embankment is calm, thereby preventing ships in the port embankment from hitting each other.

Another objective of the present invention is to provide a flow permeable port embankment, wherein the port embankment constructed by waste tires can efficiently solve the management problems of the waste tires, thereby providing an environmental protection function, and can greatly save the cost of building the port embankment, thereby providing an economical effect.

A further objective of the present invention is to provide a flow permeable port embankment, wherein by the waste tires which are arranged longitudinally and transversely, when the sea sand impacts the tires, the tire hole may reduce the flow velocity of the sea sand, thereby eliminating the impact energy of the wave.

Further benefits and advantages of the present invention will become apparent after a careful reading of the detailed description with appropriate reference to the accompanying drawings.

DETAILED DESCRIPTION OF THE INVENTION

Figure 1:
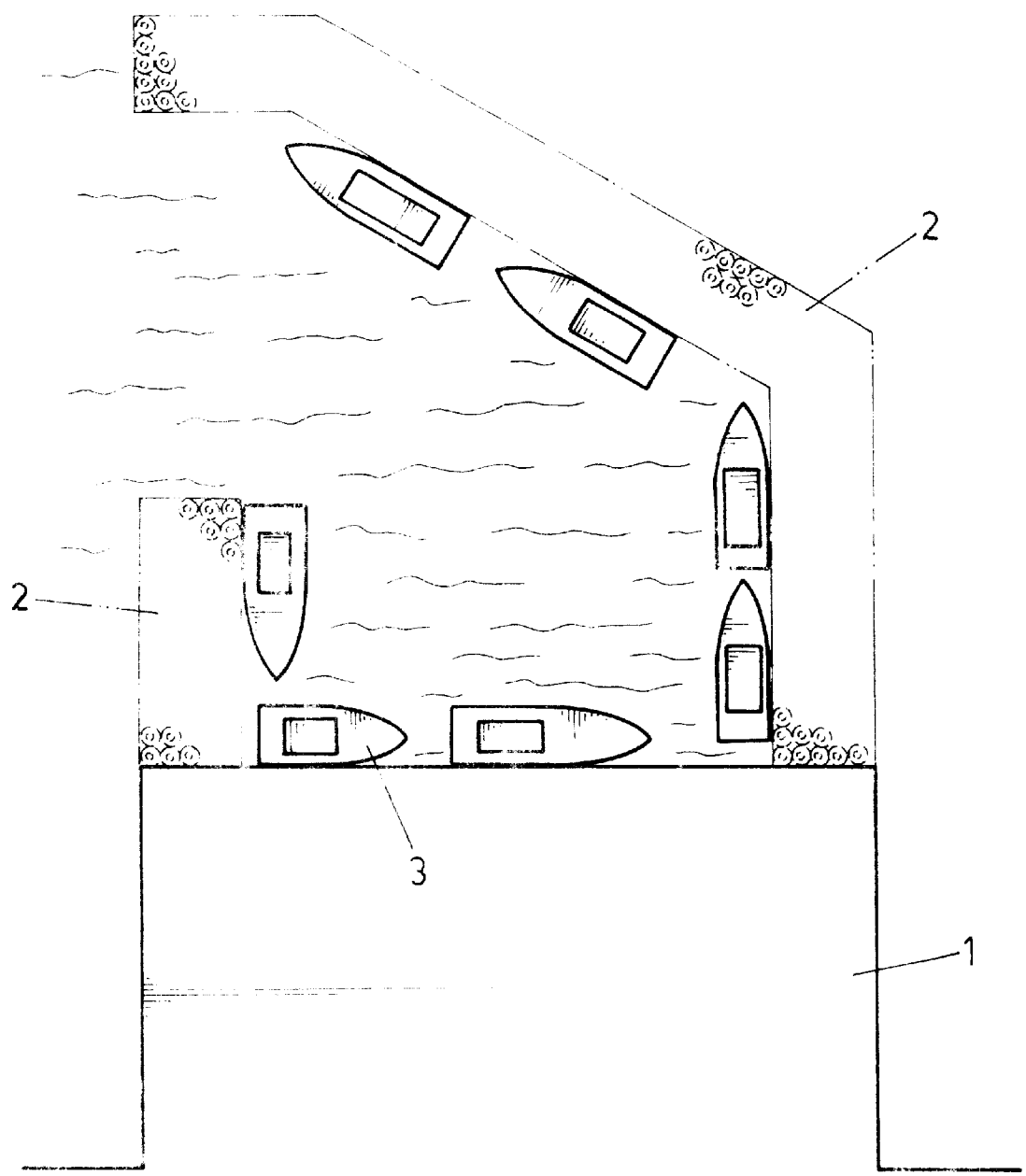
FIG. 1 is a schematic view of the flow permeable port embankment in accordance with the present invention.

Referring to the drawings and initially to FIG. 1, a flow permeable port embankment 2 in accordance with the present invention is mounted on the outside of a port cement platform 1 so as to protect ships or boats 3 when the typhoon comes.

Figure 2:
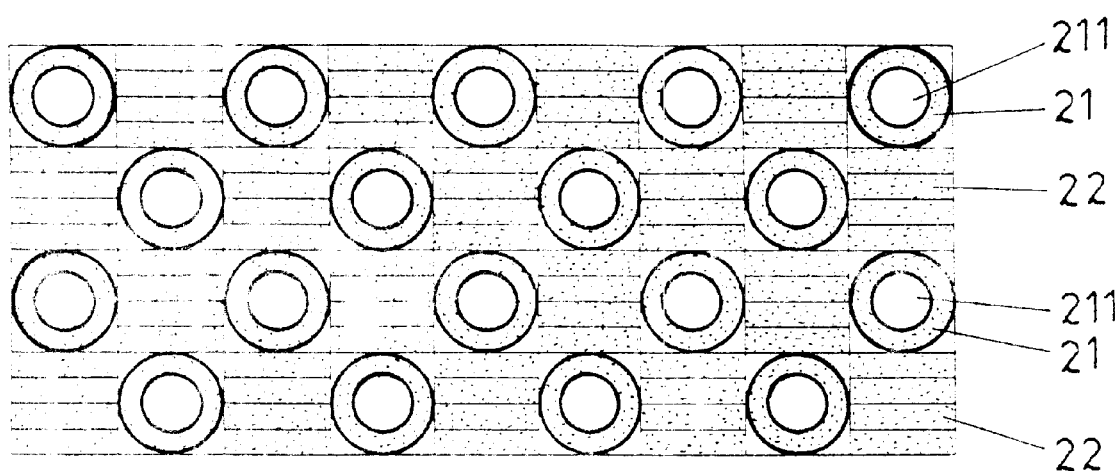
FIG. 2 is a side plan view of the flow permeable port embankment in accordance with the present invention.
Figure 3:
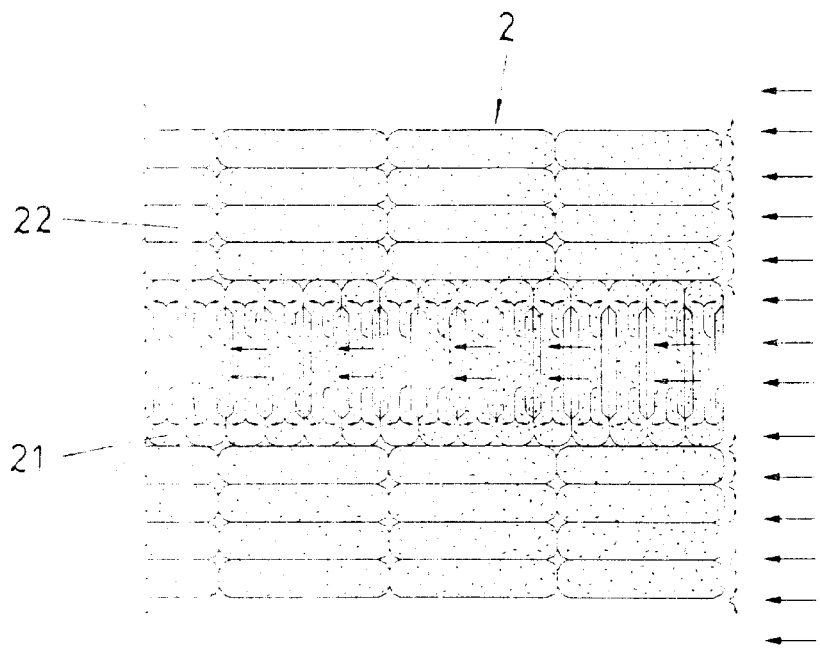
FIG. 3 is a cross-sectional view of the flow permeable port embankment in accordance with the present invention.
Figure 6:
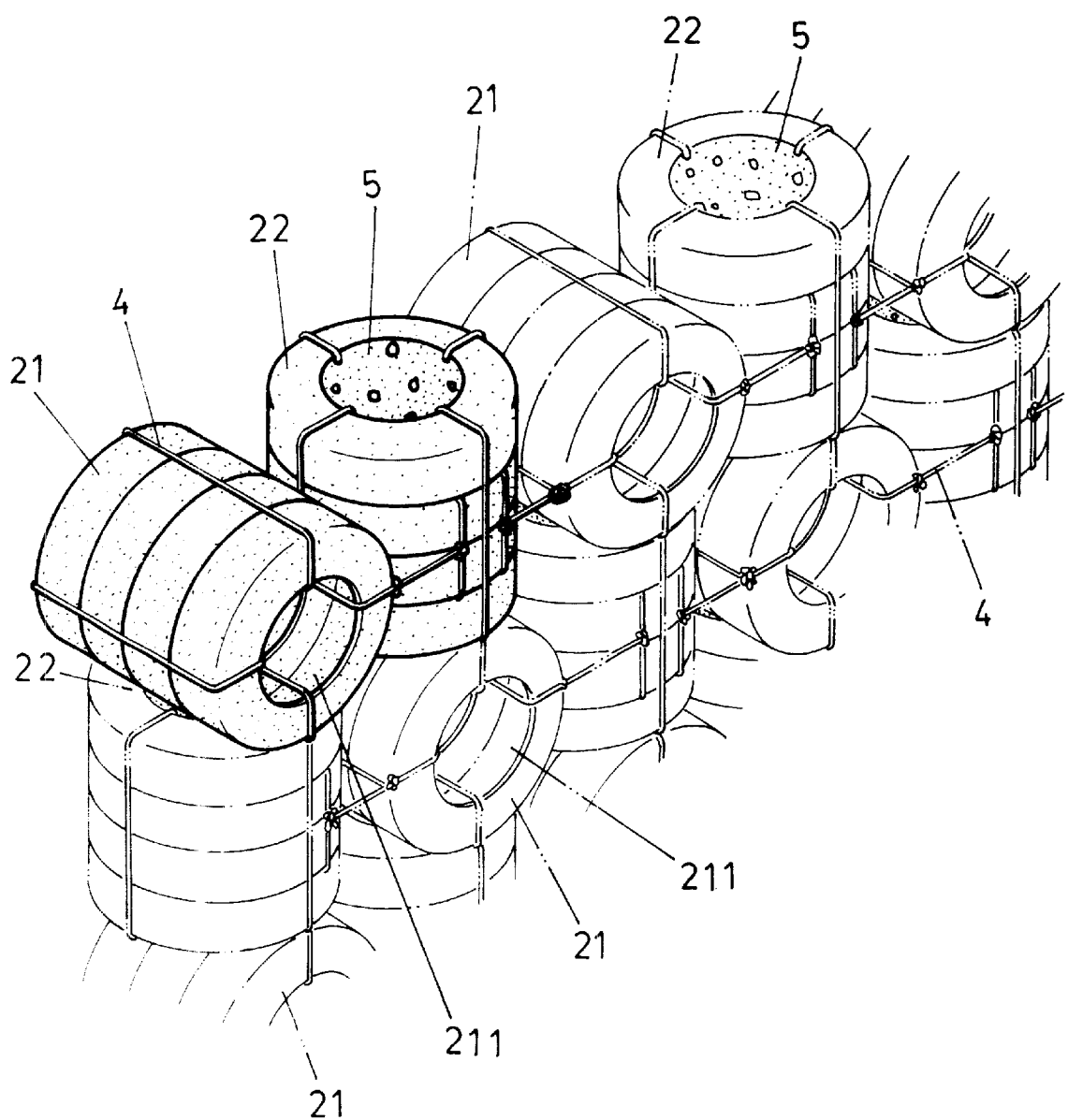
FIG. 6 is a perspective view of the flow permeable port embankment in accordance with the present invention.

Referring to FIGS. 2 and 3, the port embankment 2 of the present invention is constructed from waste tires. The port embankment 2 comprises multiple vertically arranged tires 21, and multiple horizontally arranged tires 22 that are connected to each other in a staggered manner by cables 4, cords or the like, as shown in FIG. 6. The horizontally arranged tires 22 are filled with concrete 5. The vertically arranged tires 21 and the horizontally arranged tires 22 are combined into a complete port embankment structure which may be rigidly and stably sunk into the sea. The fastening manner and the concrete pouring manner are conventional, and will not be further described in detail.

Figure 4:
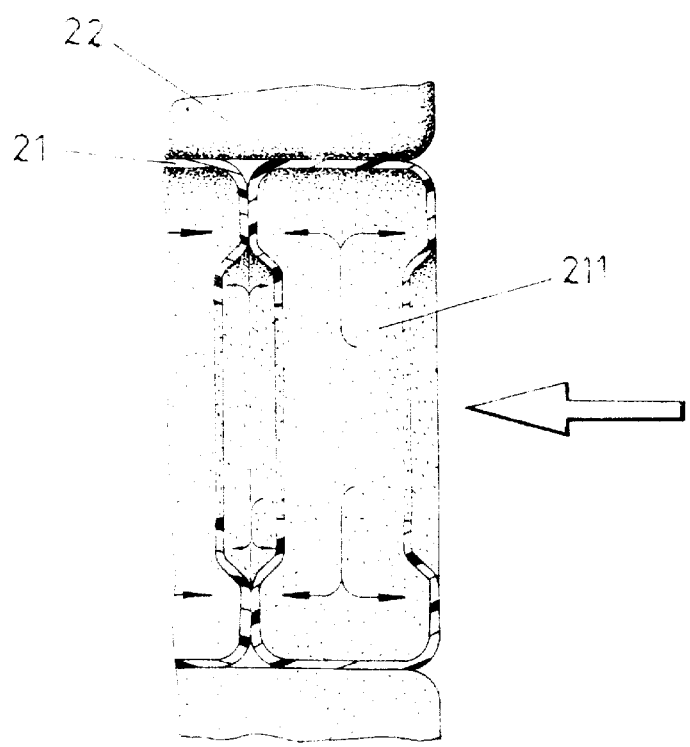
FIG. 4 is a cross-sectional view of a waste tire of the flow permeable port embankment in accordance with the present invention.

Referring now to FIGS. 3 and 4, the central hole 211 of each of the vertically arranged tires 21 has an uneven structure with concave and convex slots, thereby producing an effect for reducing the wave energy. When the big wave or surge rushes into the port embankment 2 through the central holes 211 of the vertically arranged tires 21, the big wave or surge is counteracted by the wave in the port embankment 2, such that the water region enclosed in the port embankment 2 may maintain calm, thereby preventing the ships 3 in the port embankment 2 from being worn or broken.

Figure 5:
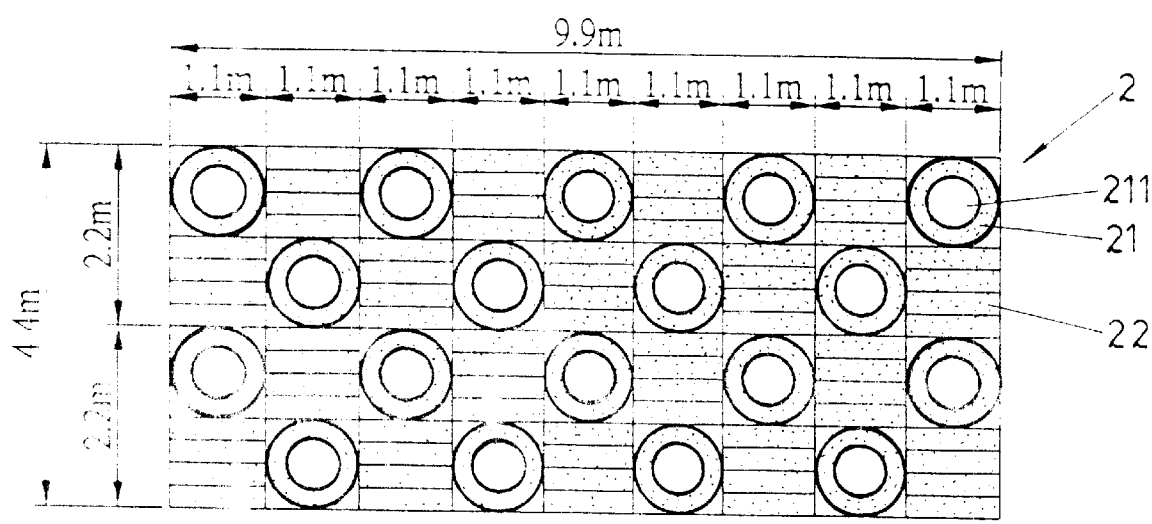
FIG. 5 is a size indication view of the flow permeable port embankment in accordance with the present invention.

In addition, the wave reducing effect of the vertically arranged tires 21 of the present invention can be estimated. As shown in FIG. 5, the area of the port embankment 2 is equal to 4.4 m×9.9 m, wherein $$4.4 \text{ m} \times 9.9 \text{ m} = 39.6 \text{ m}^2$$

The hollow portion is defined by:

$$(0.65^2 \times \pi \div 4) \times 18 = 5.973 \text{ m}^2$$

The clearance or void between the tires is defined by:

$$1.1 \times 1.1 - (1.1^2 \times \pi \div 4) = 0.26 \times 18 = 4.674 \text{ m}^2$$

The total of the void portion is defined by:

$$5.973 + 4.674 = 10.647 \text{ m}^2$$

The void rate is defined by:

$$10.647 \div 39.6 = 26.89\%$$

The laboratory of the Kyushu university has made experiment on the open holed sunk tank. According to the results of the experiment, when the open holed rate is ranged between 0.27 and 0.28, the wave pressure at the hollow portion of the open holed vertical wall can be calculated by the formula as follows.

When $Hi/h' > 0.5$, the wave pressure is decreased from $$P_0 = 1.5\omega Hi(h' + 1.25Hi)$$

to $$P_1 = 1.0\omega Hi(h' + Hi)$$

The depth of the current water level subtracts 5.0 m, then $h' = 6.38$ m, and $Hi = 4.41$ m.
Therefore, $$P_0 = 81.03 T/m^2$$

$$P_1 = 49.01 T/m^2$$

$$P_1/P_0 = 49.01/81.03 = 60.48\%$$

Next, the wave energy reduction effect produced by the concave and convex uneven structure of the vertically arranged tire 21 is about 23% of that of the hollow portion. Then, $$P_2 = 0.7855 \times P_0 = 60.28 T/m^2$$

$$P_2/P_0 = 60.28/81.03 = 78.55\%$$

Thus, the actual wave pressure applied on the wall face of the tire is defined by:

$$(A_1 P_1 + A_2 P_2)/(A_1 + A_2) = (0.2689 \times 0.6248 + 0.7311 \times 0.7855)/1 = 73.69\%$$

Thus, the wave pressure of the vertically arranged wave reduction tire embankment can be estimated by about 0.8 times.

The attenuation rate of the wave height can be estimated as follows.

When the incident wave enters the port embankment 2 through the central holes 211 of the vertically arranged tires 21, the inner space of the tire 21 is enlarged suddenly, thereby reducing the wave energy to produce the wave reduction effect. The multiple adjoining tires may in turn decrease the wave energy. The attenuation rate $K_E$ of the wave height can be estimated by the following formula.

$$K_E = (1 - K_T^2)^{1/2}$$

$K_T$ = the incident wave height ÷ the wave height of the deep sea = $Hi/H$ $$KEA = [1 - (4.407/6.8)^2]^{1/2} = 0.762$$

When 15 tires adjoin with each other, $KEi = 0.762^{15} = 0.017$ $$6.443 \times 0.017 = 0.11 \text{ m}.$$

Therefore, when the incident wave passes through the 15 hollow wave reduction tires to reach the terminal tire, the attenuation rate is equal to 0.017, while the actual wave height value supported by the wall is equal to 0.11 m, thus without making any influence.

Accordingly, the flow permeable port embankment in accordance with the present invention is constructed by waste tires, whereby the big wave or surge outside of the port embankment is automatically counteracted by the wave in the port embankment. In addition, the concave and convex uneven structure of the central hole of the vertically arranged tire can be used to reduce the wave energy, such that the water region enclosed in the port embankment may maintain calm, thereby preventing the ships in the port embankment from being worn or broken.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A flow permeable port embankment comprising:
   a plurality of tires oriented with a radial axis in a horizontal plane, subsets of said plurality of tires oriented with a radial axis in a horizontal plane being grouped into discrete modular units, and
   a plurality of tires oriented with a radial axis in a vertical plane, subsets of said plurality of tires oriented with a radial axis in a vertical plane being grouped into discrete modular units; wherein
   at least one of said tires is filled with concrete, and
   said modular units of said plurality of tires oriented with a radial axis in a horizontal plane are joined with said modular units of said plurality of tires oriented with a radial axis in a vertical plane such that said modular units are regularly staggered relative to horizontal and vertical orientation, such that said central holes of said plurality of tires oriented with a radial axis in a vertical plane serve as a wave energy reduction device to dissipate energy from large waves, thereby preventing ships sheltered by said port embankment from contacting each other.

* * * * *